United States Patent [19]

Pan

[11] Patent Number: 5,403,385
[45] Date of Patent: Apr. 4, 1995

[54] SERIAL FLOW PRESSURE SWING ADSORPTION PROCESS FOR GAS SEPARATION

[75] Inventor: Chuen Y. Pan, Edmonton, Canada

[73] Assignee: Alberta Research Council, Edmonton, Canada

[21] Appl. No.: 193,259

[22] Filed: Feb. 8, 1994

[51] Int. Cl.$^6$ ............................................. B01D 53/04
[52] U.S. Cl. ........................................ 95/100; 95/103; 95/105; 95/130
[58] Field of Search ................... 95/96, 98, 100, 103, 95/105, 116, 130, 148

[56] References Cited

U.S. PATENT DOCUMENTS

| | | | |
|---|---|---|---|
| Re. 29,941 | 3/1979 | Bird | 95/98 X |
| 3,142,547 | 7/1964 | Marsh et al. | 55/26 |
| 3,155,468 | 11/1964 | deMontgareuil et al. | 95/103 |
| 3,430,418 | 3/1969 | Wagner | 55/25 |
| 3,564,816 | 2/1971 | Batta | 55/26 |
| 3,619,984 | 11/1971 | Domine et al. | 95/103 |
| 3,636,679 | 1/1972 | Batta | 55/26 |
| 3,788,036 | 1/1974 | Lee et al. | 55/25 |
| 3,973,931 | 8/1976 | Collins | 55/58 |
| 3,977,845 | 8/1976 | Walter | 55/25 |
| 4,015,956 | 4/1977 | Münzner et al. | 95/96 |
| 4,021,210 | 5/1977 | Streich et al. | 95/100 |
| 4,194,891 | 3/1980 | Earls et al. | 55/26 |
| 4,194,892 | 3/1980 | Jones et al. | 55/58 |
| 4,299,596 | 11/1981 | Benkmann | 95/100 |
| 4,432,774 | 2/1984 | Jüntgen et al. | 95/96 |
| 4,572,723 | 2/1986 | Ward | 95/96 |
| 4,650,501 | 3/1987 | Hiscock et al. | 55/26 |
| 4,715,867 | 12/1987 | Vo | 55/26 |
| 4,732,578 | 3/1988 | Benkmann | 95/130 X |
| 4,848,985 | 7/1989 | Sadkowski | 95/100 |
| 4,892,566 | 1/1990 | Bansal et al. | 55/26 |
| 5,122,164 | 6/1992 | Hirooka et al. | 55/26 |

*Primary Examiner*—Robert Spitzer
*Attorney, Agent, or Firm*—Sheridan Ross & McIntosh

[57] ABSTRACT

The process is conducted in a circuit having first and second adsorbers and a product reservoir vessel, connected serially. The feedstock is a gas mixture containing contaminant and product components (for example, air containing $N_2$ and $O_2$). The process steps involved are: (1) feeding a charge of feed gas into the first adsorber, temporarily retaining it therein, and pressurizing it, so that the adsorbent adsorbs most of the contaminant component and purified product gas is produced; (2) co-currently depressurizing the first adsorber by discharging purified product gas through the second adsorber and reservoir vessel; (3) counter-currently venting both adsorbers; (4) partly re-pressurizing both the adsorbers with purified gas from the reservoir vessel; and then repeating steps (1)–(4) inclusive. The process includes the following advantages over PSA systems using parallel arranged adsorbers: reversal of product concentration gradient in the adsorbers is avoided; and co-current de-pressurization of the first adsorber to a very low level prior to counter-current venting is made possible, improving process efficiency.

3 Claims, 4 Drawing Sheets

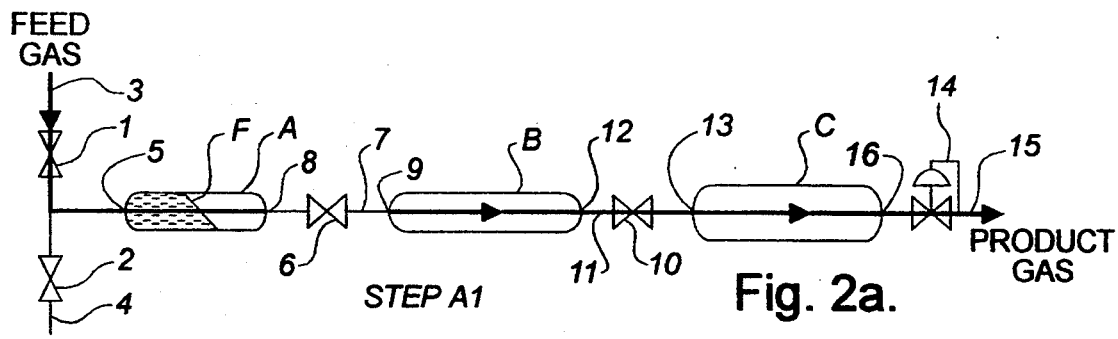
Fig. 2a. STEP A1
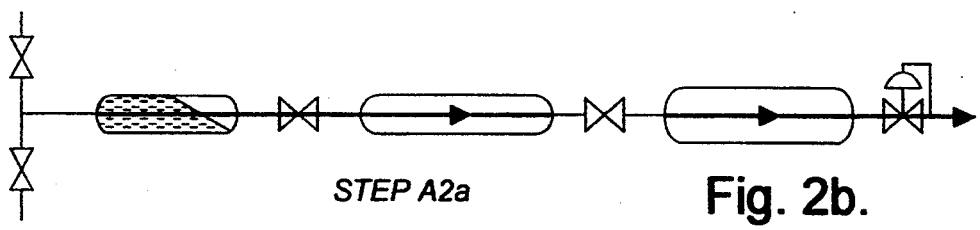
Fig. 2b. STEP A2a
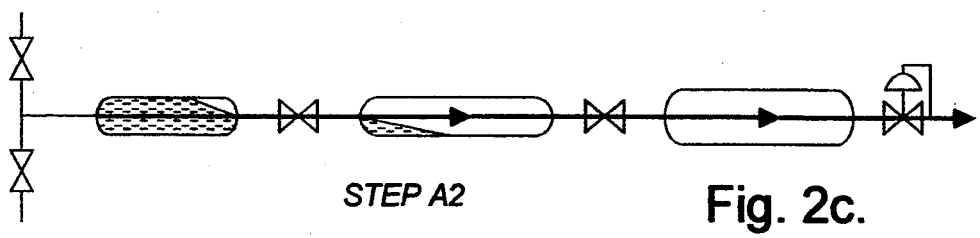
Fig. 2c. STEP A2
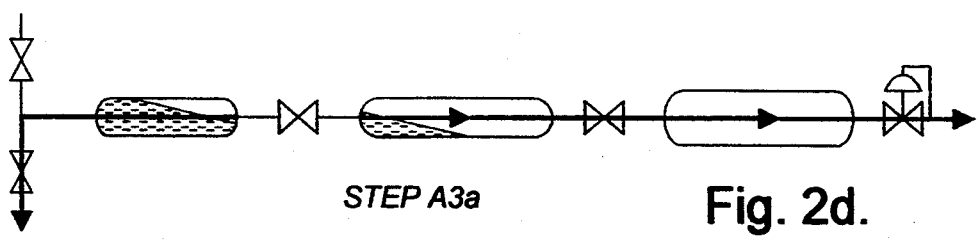
Fig. 2d. STEP A3a
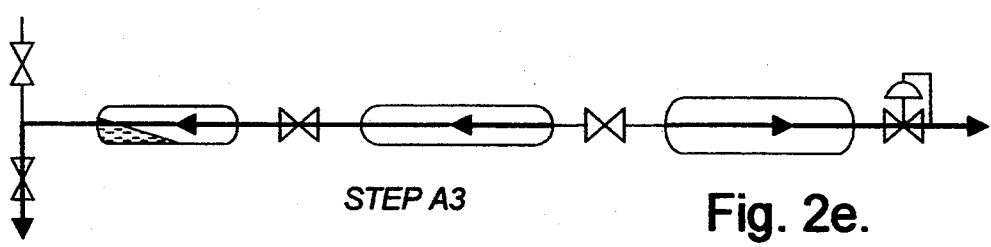
Fig. 2e. STEP A3
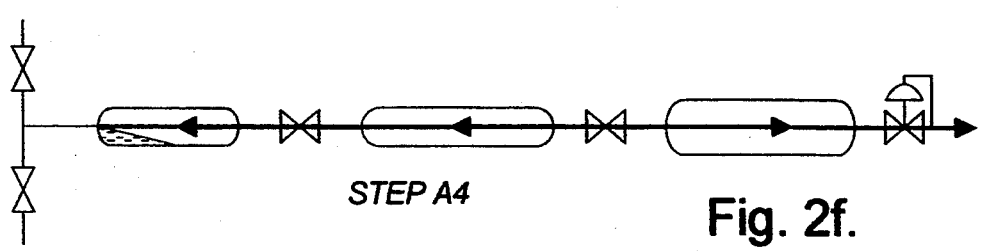
Fig. 2f. STEP A4

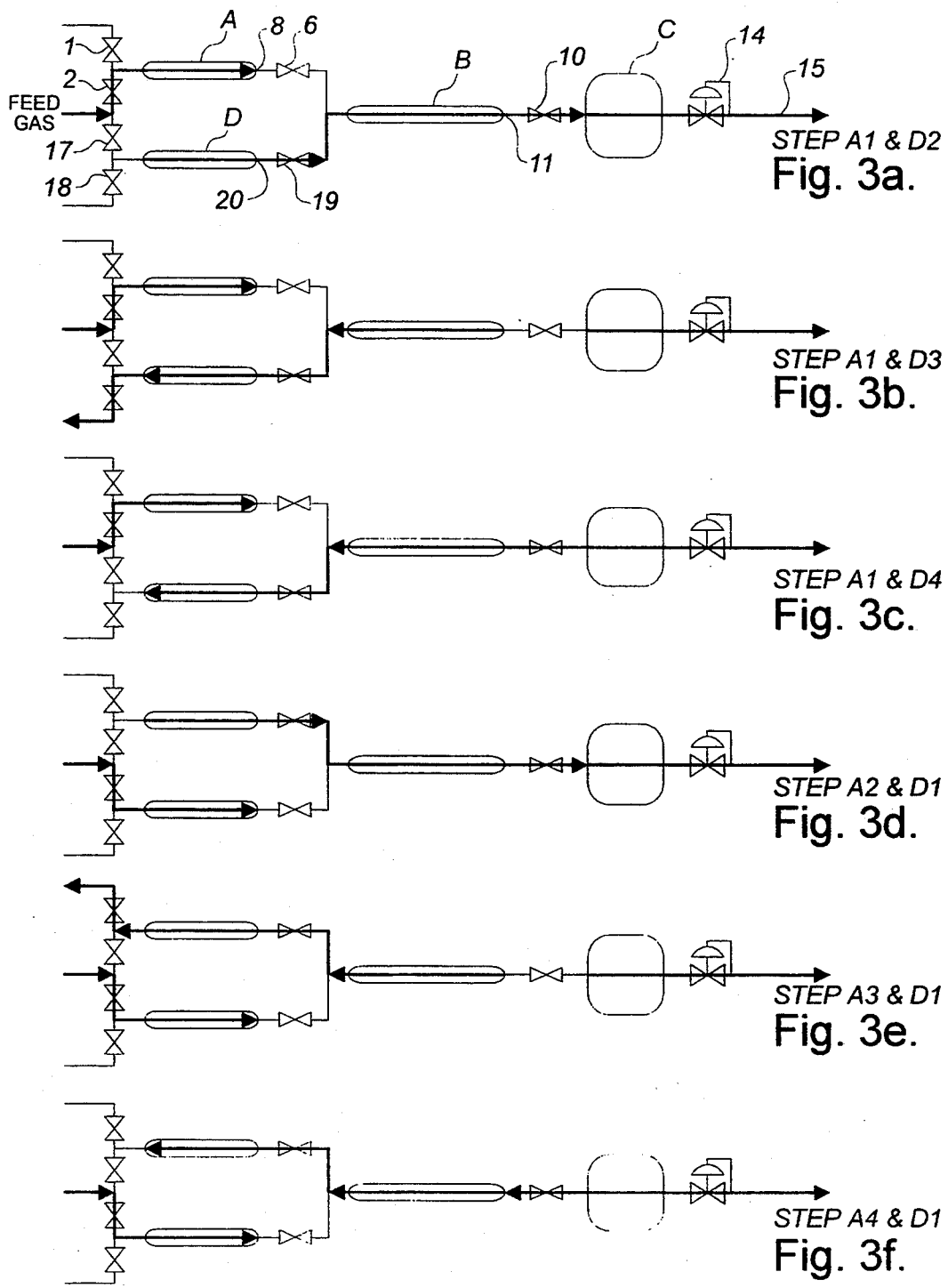

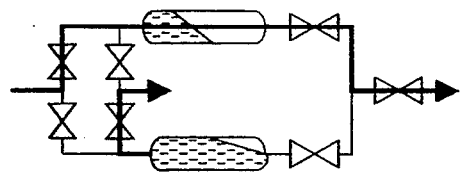
Adsorption
Counter-Current Vent
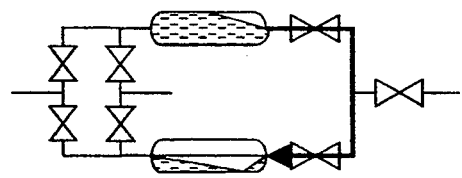
Co-Current Depress.
Repressurization
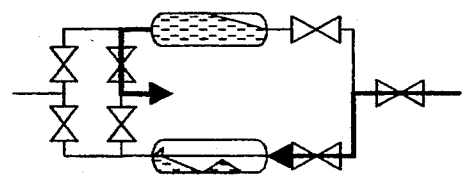
Counter-Current Vent
Repressurization
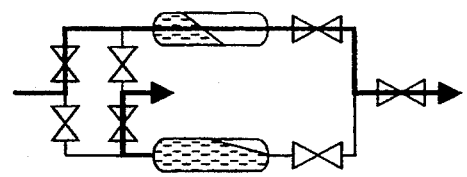
Adsorption
Counter-Current Vent
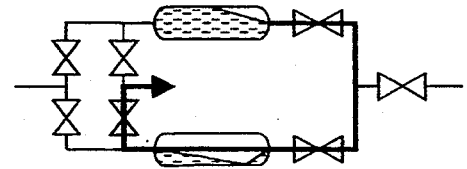
Co-Current Depress.
Counter-Current Purge
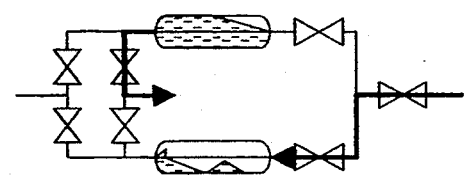
Counter-Current Vent
Repressurization
Fig. 4.

SERIAL FLOW PRESSURE SWING ADSORPTION PROCESS FOR GAS SEPARATION

FIELD OF THE INVENTION

The invention relates to a pressure swing adsorption process for separating components of a gas mixture using a circuit having two adsorbers and a product reservoir vessel arranged in series.

BACKGROUND OF THE INVENTION

The pressure swing adsorption ("PSA") process has been widely used for gas separation and purification. More specifically, the PSA process is used for oxygen production from air. The basic process is carried out in fixed bed adsorbers and involves a sequence of cyclic operating steps of high pressure adsorption of nitrogen for oxygen production followed by low pressure desorption of nitrogen for adsorbent regeneration. The process has many different configurations and operating procedures, depending on the desired trade-off between product recovery and purity and system complexity.

The present process has also been developed in connection with removing nitrogen ("$N_2$") from air to yield significantly purified oxygen ("$O_2$"). It will be described hereinbelow in connection with that particular feedstock. However it is contemplated that the invention may find application with respect to treating other gas mixtures as well.

The typical PSA process employs a set of adsorbers arranged in parallel flow relationship with each adsorber proceeding sequentially through a multi-step adsorption/desorption cycle. The adsorption step of an adsorber is generally synchronized with the desorption step of other adsorbers so that $O_2$ can be produced continuously. A typical PSA system used for the separation of the $N_2$ and $O_2$ components of air involves 3 to 4 adsorber columns ("adsorbers') arranged in parallel flow relationship. The adsorbers are each packed with a bed of adsorbent particles. This system is illustrated in U.S. Pat. Nos. 3,430,418 (Wagner), 3,564,816 and 3,636,679 (Batta) and 3,973,931 (Collins). About one to two dozen timer controlled switching valves are required in each of these systems to implement and control the cyclic sorption process. Each adsorber is operated to go through the following basic steps in sequence in a manner such that the system is continuously accepting feed air and producing $O_2$-enriched product gas:

(1) Introduction of air into the adsorber, pressurization thereof and adsorption of $N_2$ from the feed air to produce $O_2$-enriched product gas exiting from the adsorber outlet;

(2) Co-current de-pressurization ("co-current" means in the same direction as the feed air flow during adsorption) to recover $O_2$ enriched product gas still remaining in the adsorber at the end of the adsorption step, for use in pressurizing or purging other adsorbers. This usually involves multi-step de-pressurization of the adsorber and transfer of the depressurized gas to several other adsorbers through their outlet ends for the purpose of purging or re-pressurization prior to adsorption;

(3) Counter-current venting to remove adsorbed $N_2$ from the adsorbent by blowing down the adsorber to ambient pressure through its feed air inlet;

(4) Counter-current purging of the blown down adsorber to further remove the adsorbed $N_2$ using the purified product gas obtained from another adsorber undergoing co-current de-pressurization; and (5) Counter-current re-pressurization of the purged adsorber using part of the product gas or the gas obtained from another adsorber undergoing co-current de-pressurization.

So, in general, the prior art technology involves pressurization and adsorption, co-current de-pressurization, counter-current venting, counter-current purging, and counter-current re-pressurization.

Underlying the prior art multi-bed PSA technology, one of the common themes of hardware design and operating method is to maximize the utilization of the $O_2$-enriched (or purified) product gas still trapped in the mass transfer zone of the adsorber following the adsorption step. The inter-adsorber pressure equalization method is generally used to facilitate the recovery and utilization of this gas. In order to increase the effectiveness of this recovery/utilization process, it is necessary to increase the complexity of the system using a large number of switching valves to carry out multi-step pressure equalization for several pairs of adsorbers at progressively lower pressure levels.

The following shortcomings can be identified in the existing multi-bed PSA processes:

(a) During the adsorption step, there develops an oxygen concentration gradient along the length of the adsorber column, increasing in the direction of the feed air flow; the oxygen concentrations at the feed inlet and product outlet of the column are equal to that of the feed air and product gas, respectively. The concentration gradient of nitrogen is just opposite to that of oxygen; it increases in the opposite direction, toward the feed inlet. Therefore, during co-current de-pressurization, which follows the adsorption step, the nitrogen content in the gas exiting from the adsorber outlet always gradually increases with time. Hence, the more the gas is extracted from the adsorber by co-current de-pressurization, the higher is its nitrogen content;

(b) The gas obtained from the co-current de-pressurization of an adsorber is usually transferred to other adsorber columns (referred to as 'recipient adsorbers') through their product outlet ends for purging or re-pressurization. Since the nitrogen content in the said gas generally increases with time, this always creates an undesirable oxygen concentration profile in the recipient adsorber being purged or re-pressurized—the oxygen concentration decreases toward the product outlet end. In other words, the oxygen concentration gradient created by purging or re-pressurization of the recipient adsorber using the co-currently depressurized gas from another adsorber is always opposite to that developed during the adsorption step as illustrated in FIG. 4;

(c) The nitrogen contamination of the recipient adsorber outlet due to the oxygen gradient reversal, created by the purging and/or re-pressurization using the co-currently depressurized gas, will adversely affect performance of the subsequent adsorption step in the recipient adsorber, making it difficult to achieve the desired product oxygen purity. This can only be avoided by terminating the co-current de-pressurization step earlier, and stopping at a higher pressure. But this imposes a serious limit on the recovery and utilization of the already partially oxygen-enriched gas remaining in the adsorber at the end of the adsorption step.

Most existing PSA processes suffer from the drawback of oxygen concentration gradient reversal in their purging and/or re-pressurizing step. A few of the PSA systems have managed to avoid this shortcoming in the purging step by using an empty or adsorbent-filled vessel as a temporary storage vessel for the gas obtained from the adsorber undergoing co-current de-pressurization. The gas is then withdrawn from the said vessel in reverse direction and used for purging the same adsorber following its counter-current venting step (e.g. see U.S. Pat. Nos. 3,142,547 (Marsh et al), and 3,788,036 (Lee et al)). But those systems still suffer from the same said drawback in their re-pressurization step which involves gas transfer through the product outlet ends of two adsorbers. In the PSA system described in U.S. Pat. 4,715,867 (Vo), the problem of oxygen concentration gradient reversal is partially mitigated by feeding the co-currently depressurized gas from one adsorption zone to the mid-point of the other adsorption zone (rather than through the product outlet end), the said adsorption zone being defined as a pair of two serially connected adsorber columns. Half of the adsorption zone, however, is still susceptible to oxygen concentration gradient reversal.

In the simple single-column PSA processes (e.g. U.S. Pat. Nos. 4,194,892 (Jones et al), and 4,892,566 (Bansal et al)), which do not involve any gas transfer between adsorbers, there is no possibility of oxygen concentration reversal. But this advantage is more than offset by their inability to carry out the important co-current de-pressurization process. As a result, the performance of the single-column process is considerably inferior to the multi-bed process.

With this background in mind, it is the objective of the present invention to provide a process designed to eliminate the undesirable contaminant component concentration gradient reversal and to carry out more effective co-current de-pressurization.

SUMMARY OF THE INVENTION

In accordance with the invention, a novel PSA process is carried out in a circuit comprising first and second adsorbers and a product reservoir vessel, said units being arranged and connected in series.

In the practice of the process, the following steps are carried out sequentially in the circuit:

(1) feeding a charge of feed gas, comprising a mixture of product and contaminant components, into the first adsorber, with the adsorber's outlet valve closed, and temporarily retaining the charge in the adsorber and pressurizing it to a predetermined pressure, so that part of the contaminant component is adsorbed by the adsorber's adsorbent to form a product-enriched gas having an increasing product component concentration gradient and a decreasing contaminant component concentration gradient extending from the adsorber's inlet to its outlet;

(2) co-currently depressurizing the first adsorber by venting product-enriched gas through the second adsorber and product reservoir vessel, preferably through the second adsorber and product reservoir vessel one at a time;

(3) counter-currently venting the adsorbers, preferably one at a time, through the inlet of the first adsorber, to purge them;

(4) counter-currently and partly re-pressurizing the adsorbers with product-enriched gas from the reservoir vessel; and (5) repeatedly repeating the cycle of steps (1) through (4) to recover product-enriched gas from the reservoir vessel.

The process as; described is characterized by the following features:

(a) By operating the process columns serially, reversal of the component concentration gradients is avoided. More particularly, as a result of using only serial gas transfer between the adsorbers, the following occur: during feed gas re-pressurization and co-current de-pressurization both the contaminant and product component concentration gradients in the adsorbers develop in the co-current direction and create an increasing product component concentration gradient and a decreasing contaminant component concentration gradient extending from adsorber inlet to outlet. During counter-current venting and partial re-pressurization, these gradients retract in the opposite direction but the patterns of decreasing contaminant component concentration and increasing product component concentration gradients are preserved from adsorber inlet to outlet;

(b) By isolating the first adsorber from the second adsorber during feed gas pressurization, the first adsorber may be fully pressurized by the feed air to any pressure level for any length of time without the danger of contaminant breakthrough to the product vessel. Thus, the process operating cycle time can be flexible, and the adsorption capacity of the entire first adsorber can be fully utilized for gas separation. In comparison, for the single-column PSA (e.g. Jones, U.S. Pat. No. 4,194,892), in order for the process to function properly, only a relatively short section of the adsorber column near the feed inlet is permitted to be fully pressurized with the feed air. Such a delicate pressurization operation requires a relatively short and carefully controlled feed air introduction period. More importantly, it results in very limited utilization of the adsorbent capacity of the entire adsorber due to the fact that only a very short section of the adsorber is permitted to be fully pressurized with the feed air during each adsorption cycle;

(c) The presence of the second adsorber makes it possible to co-currently depressurize the first adsorber to a very low pressure level prior to the counter-current venting step. This is a direct consequence of the operating procedure of feeding the air to only a single (first) adsorber and venting the nitrogen-enriched residual air from both first and second adsorbers. It can be shown by material balance of air feed and residue vent that in the absence of the second adsorber (as in the single-column PSA process), the maximum: possible co-current de-pressurization will only reduce the pressure in the first adsorber by at most 50%, regardless of the size of the product vessel with acts as the receiver for the depressurized gas. In contrast, the present process with the second adsorber in place can easily reduce the pressure in the first adsorber by about 75% through co-current de-pressurization. Such effective co-current de-pressurization enables an improvement in process efficiency by increased recovery and utilization of the product-enriched gas in the first adsorber after pressurization;

(d) By co-currently depressurizing the first adsorber through the second adsorber and product reservoir vessel sequentially one at a time, the second adsorber can have the beneficial effect of being pressurized to an intermediate pressure level prior to depressurizing to the product vessel. The increased adsorbing capacity of the adsorbent in the second adsorber due to the said pressurization can reduce the level of contaminant in the product gas issuing therefrom.

(e) By preferably venting the first and second adsorbers sequentially one at a time, the first adsorber will reach ambient pressure before venting of the second adsorber begins—this facilitates maximum expansion of the gas from the second adsorber, which therefore provides a large volume of purging gas for the first adsorber.

(f) The present process can be conducted using fewer switching valves and interconnecting lines than the conventional multibed PSA processes (see comparative Example V below).

DESCRIPTION OF THE DRAWINGS

FIG. 2 is a schematic showing a six-step system involving serially arranged columns wherein the adsorbers are operated sequentially one at a time, except for the re-pressurization step;

FIG. 3 is a schematic showing a system of FIG. 1 configuration that can accept the feed air continuously without interruption. It is the consolidation of two units of the FIG. 1 system, but with the shared second stage adsorber and product vessel. The two first adsorbers are provided in parallel arrangement and are alternately operated to accept the feed air. Each of these two adsorbers are run independently of the other without any gas transfer between them;

FIG. 4 is a schematic showing two instances of a prior art system in which excessive co-current de-pressurization coupled with inter-column gas transfer gives rise to undesirable concentration gradient reversal in an adsorber.

DESCRIPTION OF THE PREFERRED EMBODIMENT

Figure 1A:
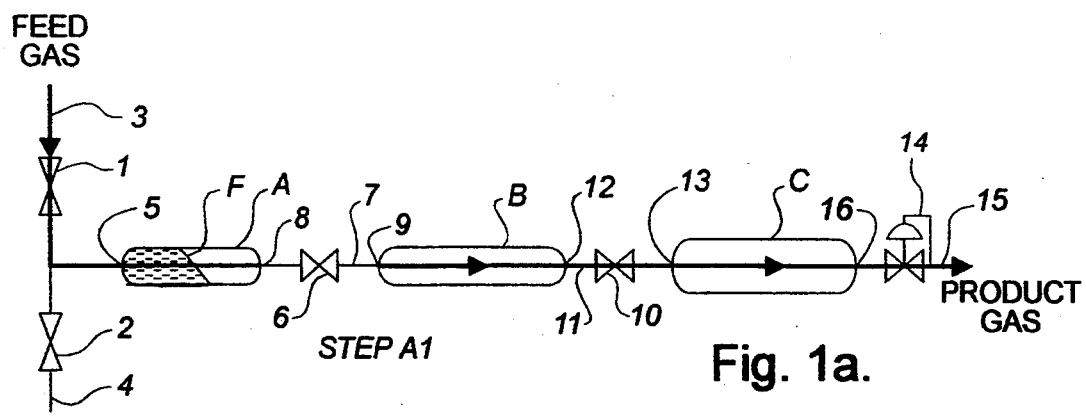
FIG. 1 is a schematic showing a four-step system involving serially arranged columns wherein the two adsorbers together are co-currently depressurized and counter-currently vented.

The invention is now described in the context of producing oxygen-enriched product gas from air.

Referring to FIG. 2, the process is conducted in a circuit comprising first and second adsorbers A, B and a reservoir vessel C, connected serially by suitable lines and timer-controlled valves. The units A and B are conventional columns packed with suitable adsorbent, such as zeolite molecular sieve particles sold under the trade mark OXYSIV by UOP Inc, of Des Plaines, Ill. The product vessel C may be empty internally or packed with adsorbent particles; the purpose of the adsorbent packing is to increase its product gas storage capacity and hence to reduce its physical size requirement. The relative volumes of adsorbers A, B and C will determine the extent of co-current de-pressurization of the first adsorber. For a given first adsorber, the said depressurization increases with increasing volumes of the second adsorber and product vessel. The preferred volume ratios for second-adsorber/first adsorber and product-vessel(adsorbent filled)/first-adsorber are in the range of 1 to 3 and 1 to 6, respectively.

Conventional solenoid or air-piloted valves were used to control flow through the adsorber and reservoir vessel columns. More particularly, valves 1, 2 control feed and discharge lines 3,4 connecting with the inlet 5 of adsorber A. Valve 6 controls line 7 connecting the outlet 8 of adsorber A with the inlet 9 of adsorber B. Valve 10 controls line 11 connecting the outlet 12 of adsorber B with the inlet 13 of reservoir vessel C. A flow regulating valve 14 controls the product line 15 leading from the outlet 16 of reservoir vessel C.

The treatment of feed gas comprises a cycle of steps shown in FIG. 2. The cycle broadly involves pressurization/adsorption of $N_2$ (step A1), recovery of product gas (steps A2a–A2), and regeneration of the adsorbent by removing adsorbed $N_2$ (steps A3a–A4).

The keys to the system are that the flow of gas through the circuit is always in series, whether in an adsorbing or regenerating step, and that the feed air is fed only to a single adsorber (A), and the residual waste air is vented from both adsorbers (A, B).

The flow of gas through the circuit is indicated in FIG. 2 by the bold line. An advancing adsorption front F develops in the chambers of the columns, as fancifully illustrated in FIG. 2. Fanciful indications of the concentration gradients of contaminant and product are shown by the black and white portions of FIG. 2.

During the adsorption step A1, air is introduced through line 3 into adsorber A with outlet valve 6 closed. The air is pressurized to a relatively high pressure (typically 40 psig). $N_2$ is adsorbed onto the contained adsorbent under the pressurized condition. An increasing $O_2$ concentration gradient and a decreasing $N_2$ concentration gradient are formed and extend from the inlet 5 to outlet 8.

Simultaneously with adsorption in adsorber A, valves 10, 14 are open and the adsorber B and reservoir vessel C produce contained $O_2$-enriched product gas from a previous cycle.

In step A2a, co-current de-pressurization of adsorber A to an intermediate pressure is initiated. This is accomplished by opening valve 6 and closing valves 1 and 10. Production from adsorber B is therefore terminated and $O_2$-enriched product gas flows from adsorber A into adsorber B, to pressurize the latter. The adsorption front F advances into adsorber B.

In step A2, valve 10 is opened and de-pressurization of adsorber A is continued in conjunction with de-pressurization of adsorber B, by flow through reservoir vessel C and product line 15. The three units A, B and C become substantially equalized in pressure.

It will be noted that the adsorbers A, B have been depressurized sequentially, one unit at a time.

In step A3a, the valve 6 is closed and valve 2 is opened and the adsorber A is counter-currently vented through line 4 to atmosphere, to desorb $N_2$. The adsorption front F begins to shift back toward the adsorber-inlet 5.

In step A3, valve 6 is opened and valve 10 is closed. As a result, the adsorber B now is also counter-currently vented to atmosphere through adsorber A and line 4.

It will be noted that the adsorbers A, B have been counter-currently vented sequentially and one at a time.

In step A4, the venting valve 2 is closed and the valve 10 is opened. The adsorbers A, B are therefore partly re-pressurized counter-currently with $O_2$-enriched product gas from the reservoir vessel C. The adsorption front F is moved closer to the inlet 5 of adsorber A.

Figure 1B:
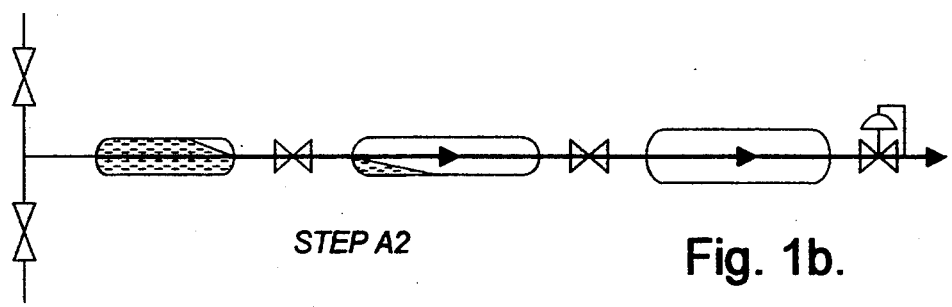
Figure 1C:
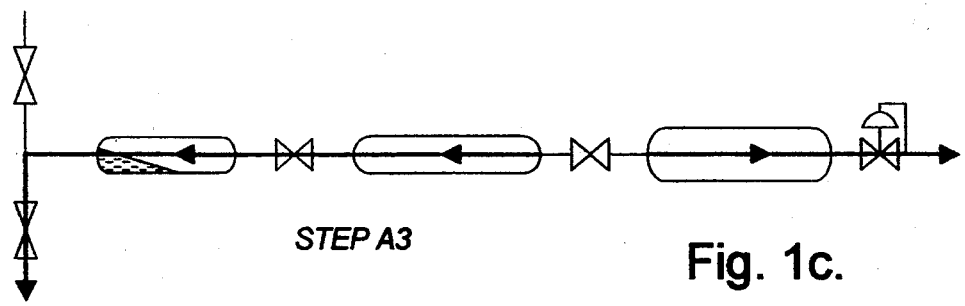
Figure 1D:
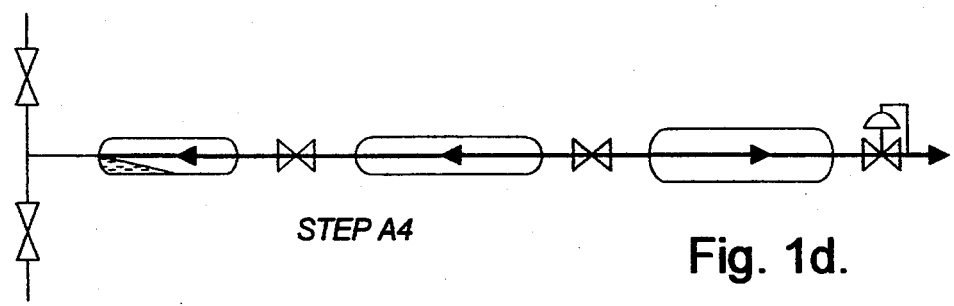

The PSA cycle can be simplified by co-currently depressurizing both the first and second adsorbers A, B simultaneously and by counter-currently venting both adsorbers simultaneously instead of sequentially. This is accomplished by reducing the sequential timing, between performing steps A2a and A2 and between A3a and A3, to zero. This is equivalent to skipping steps A2a and A3a and sequentially performing steps A1, A2, A3 and A4 as shown in FIG. 1. This simplification reduces the number of process steps to four, from six, shortening the operating cycle period which can speed up the product gas production rate. However, product gas purity may be reduced somewhat by skipping the sequential de-pressurization steps.

The invention can be adapted to continuously treat feed gas 1 by adding another first stage adsorber D in parallel with the first stage adsorber A, as shown in FIG. 3. The second stage adsorber B and product vessel C are shared between the two first stage adsorbers A, D. Operation is alternated between columns A, B and C in series and columns D, B and C in series. Feed gas and residue vent valves 1,2, 17, 18 are provided for the adsorbers A, D forming the first stage. Outlet valves 6, 19 control the outlets 8, 20 of the adsorbers.

The process steps shown in FIG. 3 correspond to the steps shown in FIG. 1. While one first adsorber D undergoes the adsorption step D1 (equivalent to step A1 of FIG. 1), the other first adsorber A undergoes production and regeneration steps A2, A3 and A4 as detailed previously. Similarly, while first adsorber A undergoes the adsorption step A1, production and regeneration steps D2, D3 and D4 are performed for adsorber D.

The invention and the importance of its features are supported by the following examples.

EXAMPLE I

In this example, the performances: for two different operational modes of the invention are provided. In a first test, a full six step cycle was performed in accordance with FIG. 2, sequentially staging the co-current de-pressurization steps and counter-current venting steps for each of first and second adsorbers, one at a time. In the second test, the first and second adsorbers were depressurized and vented simultaneously, therefore requiring only 4 steps per cycle, in accordance with the scheme illustrated in FIG. 1.

Making reference to FIG. 2 using a six step cycle, the co-current depressurization of the first adsorber A (step A2a) enables a beneficial short term pressurization of the second adsorber B. Characteristic of adsorbing processes, the adsorbing capacity of the adsorbent is improved by higher pressure, thus reducing the level of contaminant in the product gas issuing therefrom.

In the staged counter-current venting of the first adsorber A (step A3a), the pressure in the first adsorber is reduced to very low levels, prior to the sequential venting of the second adsorber B. This enables maximum expansion of the purging gas issuing from the second adsorber, providing large volume of purge gas for effective regeneration of the first adsorber A.

The subtle yet beneficial effects described above are more effective in the six step cycle than in the simplified four step cycle. The improved purity and recovery of the six step cycle are demonstrated as shown in Table 1. The disadvantage of the six step cycle appears in the production rate which is seen to drop correspondingly.

TABLE 1

| Embodiments | FIG. 1 (four step); FIG. 2 (six step) | | |
|---|---|---|---|
| Column | A | B | C |
| ID cm | 3.2 | 3.2 | 6.0 |
| Length cm | 23 | 23 | 23 |
| Adsorbent gram | 140 | 140 | 480 |
| Pressure (Max) psig | | 65 | |
| Six Step | A1, A2a, A2, A3a, A3, A4 (10, 2, 2, 1, 3, 2, seconds) | | |
| Four Step | A1, A2, A3, A4 (9, 3, 3, 3 seconds) | | |

| Performance | Oxygen Purity % | Oxygen Recovery % | Product Rate cc/min |
|---|---|---|---|
| Six Step | 92 | 37 | 450 |
| Four Step | 89 | 36 | 508 |

EXAMPLE II

In this example, the performances for two embodiments of the invention are compared. In a first test, one first stage adsorber A was provided, as per FIG. 1, using a four step cycle. In a second test an additional first stage adsorber D was provided in parallel to adsorber A, as per FIG. 3. The adsorbers A, D were each used serially with the other columns B, C although the adsorbers A and D were used alternatively and independently of each other.

As shown in Table 2, the productivity results for the second test were roughly twice that achieved for the first test. Thus continuous feeding of air was accomplished and twice the clean product gas was produced having added only a single first adsorber in parallel and operating the other two columns in conjunction with each first adsorber in sequence.

TABLE 2

| Embodiment | | Test 1 FIG. 1 | | | Test 2 FIG. 3 | | |
|---|---|---|---|---|---|---|---|
| Column | | A | B | C | A&D | B | C |
| ID | cm | 3.2 | 2.5 | 3.7 | 3.2 | 2.5 | 3.7 |
| Length | cm | 23 | 47 | 34 | 23 | 47 | 34 |
| Adsorbent | gram | 140 | 178 | 280 | 140 | 178 | 280 |
| Pressure (Max) | psig | 20 | | | 20 | | |
| Step | | A1 | A2 | A3 | A4 | A1 D1 | A2 D2 | A3 D3 | A4 D4 |
| Step Interval | s | 16 | 4 | 8 | 4 | 16 | 4 | 8 | 4 |
| Performance (for 90% pure Oxygen product) | | | | | | | |
| $O_2$ Recovery | % | | 33 | | | | 34 | |
| Product Flow | cc/min | | 94 | | | | 200 | |

EXAMPLE III

In this example, the performance for the method of the invention portrayed in FIG. 3 was determined for the production of 90% oxygen for a variety of adsorption pressures and cycle periods. During the pressurization step, the feed air pressure required to pressurize the first stage adsorber increased gradually from a low level to the maximum value. Thus the air supply pressure needs not always be at the maximum level. The average pressure during the pressurization step is a more important parameter than the maximum pressure, because the former determines the air compression requirement of the process. Both the maximum and average pressures are shown in Table 3, which presents the corresponding test results.

TABLE 3

| Stage Column | | First A | First D | Second B | Product C |
|---|---|---|---|---|---|
| ID | cm | 4.45 | 4.45 | 2.85 | 3.75 |
| length | cm | 19.3 | 19.3 | 93 | 132 |
| Adsorbent | gram | 230 | 230 | 454 | 1120 |
| Performance | | | | | |
| Maximum Pressure Feed psig | Average pressure feed psig | Overall cycle s | Product flow cc/min | Oxygen recovery % | |
| 20 | 11 | 32 | 390 | 35 | |
| 40 | 22 | 32 | 800 | 40 | |
| 60 | 33 | 32 | 1230 | 45 | |
| 80 | 44 | 32 | 1550 | 50 | |
| 80 | 44 | 22 | 2000 | 43 | |

EXAMPLE IV

In this example, the advantage of providing a second adsorber in series is illustrated.

One test was performed by providing the three columns in series, in accordance with the present invention. A second test was performed by providing only the first adsorber and a product reservoir vessel in series. The second test is representative of the prior art PSA systems of Jones and Bansal, although they were operated according to the procedure of FIG. 1. Table 4 details the sizes of the columns and the performance of the systems.

TABLE 4

| Embodiment | | Test 1 FIG. 2 | | | | Test 2 Prior Art | | | |
|---|---|---|---|---|---|---|---|---|---|
| Column | | A | B | C | | A | | C | |
| ID | cm | 3.7 | 3.7 | 3.7 | | 3.7 | | 3.7 | |
| Length | cm | 34 | 34 | 68 | | 34 | | 68 | |
| Adsorbent | gram | 280 | 280 | 560 | | 280 | | 560 | |
| Pressure (Max) | psig | 20 | | 20 | | | | | |
| Step | | A1 | A2 | A3 | A4 | A1 | A2 | A3 | A4 |
| Step Interval | s | 12 | 4 | 4 | 4 | 12 | 4 | 4 | 4 |
| Performance (for 90% pure Oxygen product) | | | | | | | | | |
| O₂ Recovery | % | | 35.6 | | | | 28.3 | | |
| Product Flow | cc/min | | 350 | | | | 253 | | |

EXAMPLE V

In this example, the method of the invention illustrated in FIG. 3 is compared to the multi-bed PSA system of Hiscock (U.S. Pat. No. 4,650,501) and the vacuum PSA system of Hirooka (U.S. Pat. No. 5,122,164). Comparable oxygen recoveries were experienced, however much improved productivity of oxygen product per unit of adsorbent was realized with significantly fewer demands for equipment. Table 5 illustrates the operational parameters, equipment requirements and the relative productivity of the method of the present invention and the prior art.

TABLE 5

| Embodiment | | Invention FIG. 3 | Invention FIG. 3 | Prior Art Hiscock | Prior Art Hirooka |
|---|---|---|---|---|---|
| Adsorb Press | psig | 20 | 40 | 40 | 3.5 |
| Regen Press | psig | 0 | 0 | 0 | −11 |
| # of valves | | 7 | 7 | 30 | 12 |
| Other Equip | | | | | Vacuum pump |
| Performance | | | | | |
| Productivity, cc O₂/min per cc Adsorbent | | 0.9 | 1.9 | 0.26 | 0.7–1.0 |
| O₂ Recovery | % | 45 | 52 | 49–53 | 45–59 |

Note:
a) Invention productivity based on the adsorbent contained within the first and second stages.
b) Invention operated on a 32 second cycle.
c) Invention adsorption pressure is the average pressure in the first stage adsorber during the pressurization step The embodiments of the invention in which an exclusive property or privilege is claimed are defined as follows:

1. A pressure swing adsorption process for separating product and contaminant components of a feed gas in a circuit comprising first and second adsorbers, containing adsorbent, and a product reservoir vessel, connected in series, each adsorber having inlet and outlet ends, to recover product-enriched gas from which contaminant component has been removed, comprising:
   (a) feeding a charge of the gas feed into the first adsorber and temporarily retaining it therein and pressurizing it to a predetermined pressure, so that part of the contained contaminant component is adsorbed by the adsorber's adsorbent to form product-enriched gas having an increasing product component concentration gradient and a decreasing contaminant component concentration gradient extending from the adsorber's inlet to its outlet;
   (b) co-currently depressurizing the first adsorber by venting some of the product-enriched gas through the second adsorber and product reservoir vessel;
   (c) counter-currently venting the adsorbers through the inlet of the first adsorber to purge them;
   (d) partly re-pressurizing the adsorbers with product-enriched gas flowed counter-currently from the reservoir vessel;
   (e) repeatedly repeating the cycle of steps (a) to (d) inclusive to recover product-enriched gas from the reservoir vessel.

2. The process as set forth in claim 1 comprising:
co-currently depressurizing the adsorbers sequentially, one at a time.

3. The process as set forth in claim 2 comprising:
counter-currently venting the adsorbers sequentially, one at a time.

* * * * *